United States Patent [19]

Martin

[11] Patent Number: 4,617,361

[45] Date of Patent: Oct. 14, 1986

[54] PROCESS AND CATALYST FOR OLEFIN POLYMERIZATION

[75] Inventor: Joel L. Martin, Bartlesville, Okla.

[73] Assignee: Phillips Petroleum Company, Bartlesville, Okla.

[21] Appl. No.: 463,172

[22] Filed: Feb. 3, 1983

Related U.S. Application Data

[62] Division of Ser. No. 264,513, May 18, 1981, Pat. No. 4,384,982.

[51] Int. Cl.$^4$ .......................... C08F 4/02; C08F 10/00
[52] U.S. Cl. .................................. 526/114; 526/352
[58] Field of Search ........................................ 526/114

[56] References Cited

U.S. PATENT DOCUMENTS

| | | | |
|---|---|---|---|
| 3,179,647 | 4/1965 | Mulley et al. | 526/114 |
| 3,238,146 | 3/1966 | Hewett et al. | 526/114 |
| 3,812,089 | 5/1974 | Tashiro et al. | 526/114 |
| 4,191,816 | 3/1980 | Columberg | 526/114 |
| 4,218,339 | 8/1980 | Zucchini et al. | 526/125 |
| 4,384,087 | 5/1983 | Capshew | 526/114 |

FOREIGN PATENT DOCUMENTS 865248 4/1961 United Kingdom ................ 526/114

*Primary Examiner*—Edward J. Smith
*Attorney, Agent, or Firm*—Edward L. Bowman

[57] ABSTRACT

A process and catalyst for the polymerization of olefins wherein the catalyst is prepared by reacting scandium, yttrium or rare earth metal halides with certain transition metal compounds, reacting that product with an organometallic compound, and then reacting that product with a halide ion exchanging source.

14 Claims, No Drawings

PROCESS AND CATALYST FOR OLEFIN POLYMERIZATION

This application is a divisional of U.S. patent application Ser. No. 264,513, filed May 18, 1981, now U.S. Pat. No. 4,384,982.

This invention relates to a process for producing polymers of alpha-olefins and a catalyst suitable for use in that process.

BACKGROUND

In the polymerization of alpha-olefins, it is known to use catalyst systems comprising a transition metal compound and an organometallic compound. It is further known that the productivity of such catalysts can generally be improved if the transition metal compound is employed in conjunction with a metal halide such as magnesium halide. Some especially active catalyst components have been obtained by reacting an oxygen-containing organic compound of transition metals with a magnesium dihalide and then reacting that product with an organoaluminum halide.

The present invention is concerned with new high productivity catalysts which employ scandium, yttrium, or rare earth metal halides in place of at least part of the magnesium dihalide.

SUMMARY OF THE INVENTION

In accordance with the present invention, there is provided an olefin polymerization catalyst produced by
(1) reacting at least one metal halide selected from the halides of scandium, yttrium, and rare earth metals having atomic numbers in the range of 57 to 71 with at least one transition metal compound of metals of Groups IVB and VB of the periodic table, then
(2) reacting the product of (1) with an organometallic compound, and then
(3) treating the resulting solid with a halide ion exchanging source.

The metal halides are employed in the +3 oxidation state in substantially anhydrous form and comprise scandium, and yttrium and the rare earth elements starting with lanthanum and ending with lutetium. Generally, the chlorides are preferred because of availability. Examples of preferred compounds include neodymium trichloride, praseodymium trichloride, lanthanum trichloride, yttrium trichloride and mixtures thereof. Neodymium trichloride is particularly preferred because of its efficacy.

The transition metal compound is selected from those in which the transition metal is selected from the group consisting of Group IVB and Group VB metals of the Periodic Table and in which the transition metal is bonded to at least one chalcogen atom selected from the group consisting of oxygen, nitrogen, and sulfur atoms and said chalcogen atoms are in turn bonded to a carbon containing radical. Examples of such transition metal compounds include titanium tetrahydrocarbyloxides, titanium tetraimides, titanium tetraamides, titanium tetramercaptides, zirconium tetrahydrocarbyloxides, vanadium tetrahydrocarbyloxides, vanadium tetramercaptides, and the like.

The titanium tetrahydrocarbyloxides are the preferred transition metal compounds because they produce excellent results and are readily available. Typical titanium tetrahydrocarbyloxides have the general formula $$Ti(OR)_4$$

wherein each R is individually selected from alkyl, cycloalkyl, aryl, alkaryl, and aralkyl hydrocarbon radicals containing 1 to 20 carbon atoms per radical, preferably 1 to 10 carbon atoms per radical. Examples of specific compounds of this type include titanium tetramethoxide, titanium tetraethoxide, titanium tetra-n-butoxide, titanium tetradodecyloxide, titanium tetraeicosyloxide, titanium tetracyclohexyloxide, titanium tetraphenyloxide, titanium tetrabenzyloxide, and the like. Titanium tetraalkoxides are generally preferred.

The molar ratio of the transition metal compound to the metal halide can be selected over a relatively broad range. Generally, the molar ratio is in the range of about 10:1 to about 1:10, more commonly about 2:1 to about 1:2.

The metal halide and the transition metal compound are normally mixed together in a suitable dry solvent or diluent (i.e. one essentially free of water). Typical solvents or diluents include, for example, normally liquid hydrocarbons having 3 to 12 carbon atoms as n-pentane, n-heptane, methylcyclohexane, toluene, xylenes, and the like.

Generally, the amount of solvent or diluent employed in the first step can vary over a broad range. Usually the amount of solvent or diluent is within the range of about 20 to 100 cc per gram of metal halide. Normally, the first step is conducted at temperatures in the range of about 15° C. to about 150° C. when the heating step is carried out at atmospheric pressure. Higher temperatures are generally employed with higher pressures. Preferably, conditions are selected so that at least a substantial portion of the reaction product will be in solution.

The organometal compound used in step (2) of the catalyst formation can be a compound selected from a element of Groups IA, IIA, IIB, and IIIA of the Periodic Table. Some typical examples of such compounds include lithium alkyls, Grignard reagents, dialkylmagnesium compounds, dialkylzinc compounds, organoaluminum compounds, and the like. The preferred organometallic compounds are the organoaluminum halides of the general formula $$AlR'_nX_{3-n}$$

wherein R' is a hydrocarbyl radical containing 1 to 20 carbon atoms, X is a halogen, preferably chlorine or bromine, and n is any number such that $1 \leq n \leq 2$. Examples include dimethylaluminum bromide, diethylaluminum chloride, diisobutylaluminum bromide, didodecylaluminum chloride, dieicosylaluminum bromide, ethylaluminum dichloride, ethylaluminum sesquichloride, and the like, and mixtures thereof.

The organometallic compound is reacted with a solution of the product of step (1). Preferably, a hydrocarbon solution of the organometallic compound is combined with a solution of the product of step (1).

The temperatures employed in step (2) can vary over a wide range, generally being in the range of about −100° C. to about 50° C. Good results have been obtained using temperatures of about 25° C. Following the combination of the organometallic compound and the solution of step (1), the composition is generally stirred or agitated for a sufficient time to insure complete mixing of the components, e.g. 15 minutes to 5 hours. After stirring is discontinued the solid product is recovered by filtration or decantation, washed with a dry hydrocarbon such as n-heptane, toluene, etc. to remove any soluble material that may be present, and optionally dried.

The mole ratio of the transition metal compound used in the first step to the organometallic compound used in the second step can be selected over a broad range, generally in the range of 10:1 to 1:10.

The solid product resulting from step (2) is then reacted with a halide ion exchanging source selected from the halide containing compounds of elements of Groups IVA and VA and transition metal halides of Groups IVB and VB. The term halide ion exchanging source is used herein to denote those compounds capable of adding halogen to the solid product resulting from step (2) and promoting the catalytic activity for olefin polymerization.

Particularly preferred halide ion exchanging sources include halides of transition metals, such as titanium tetrachloride, vanadium oxychloride, zirconium oxychloride, and zirconium tetrachloride, and halides of Group IVA and VA elements, such as $COCl_2$, $PCl_3$, $SiCl_4$, $SnCl_4$, $CCl_4$ and acid chlorides of the formula R'COCl where R' is an aliphatic or aromatic radical, preferably containing 1 to 20 carbon atoms. Currently preferred halide ion exchanging sources include titanium tetrahalides, e.g. titanium tetrachloride, halogenated silicon compounds, e.g. silicon tetrachloride, trichlorosilane, and mixtures thereof, e.g. titanium tetrachloride and trichlorosilane.

The solid product from step (2) can be contacted with the halide ion exchanging source neat or in a liquid medium. Generally, the product of step (2) is contacted in a liquid diluent containing the halide ion exchanging source. Examples of suitable diluents include n-pentane, n-heptane, cyclohexane, benzene, and m-xylene.

The temperature employed in step (3) is generally in the range of about $-25°$ C. to about $250°$ C., preferably about $0°$ C. to $200°$ C. The treating time can be varied over a broad range and generally is in the range of about 10 minutes to about 10 hours.

While the weight ratio of the halide ion exchanging source can be selected over a wide range, including the use of excess, the weight ratio of said source to the solid product of step (2) is generally in the range of about 10:1 to about 1:10, more preferably about 7:1 to about 1:4. Following the treatment of the solid product of step (2) with the halide ion exchanging source the surplus halide ion exchanging source is removed by washing with a dry liquid of the type used in the previous step. The resulting product after drying is stored under dry nitrogen until use.

If desired, the catalyst can be mixed with a particulate diluent such as silica, silica-alumina, silica-titania, magnesium chloride, magnesium oxide, polyethylene, polypropylene, and poly(phenylene sulfide), prior to using the composition in a polymerization process. The weight ratio of diluent to catalyst can range from about 100:1 to about 0.01:1.

The inventive catalyst composition is useful for the polymerization of olefins. Typical polymerizable olefins include the aliphatic monoolefins having 2 to 18 carbon atoms. The term polymerization is used herein to include both homo- and co-polymerization. In copolymerization other polymerizable monomers can be employed with the olefins. Examples include conjugated and nonconjugated dienes such as 1,3-butadiene, isoprene, 1,5-hexadiene, etc.

The inventive catalyst is particularly well suited for the preparation of ethylene homopolymers and copolymers which contain at least 90 mole percent, and preferably 95 mole percent ethylene.

In the polymerization of olefins, the inventive catalyst composition is used with a suitable cocatalyst of the type generally used with titanium-containing olefin polymerization catalysts. Typical examples include organometallic compounds of Groups I, II, and III of the Periodic Table, i.e. alkali metal alkyls or aryls, dialkylmagnesium, dialkylzinc, Grignard reagents, and organoaluminum compounds.

It is presently preferred that the cocatalyst be an organoaluminum compound of the formula $AlR'_m Y_{3-m}$ wherein each R' is a hydrocabyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halides, and m is a number in the range of 1 to 3.

Examples of specific compounds include trimethylaluminum, triethylaluminum, triisobutylaluminum, tridodecylaluminum, trieicosylaluminum, tricyclohexylaluminum, triphenylaluminum, triisopropenylaluminum, tribenzylaluminum, diethylaluminum chloride, ethylaluminum dichloride, isopropylaluminum dibromide, diisobutylaluminum hydride, and the like, and mixtures thereof.

For the polymerization of monomers consisting predominantly of ethylene, it is currently preferred to use a trialkylaluminum cocatalyst such as triethylaluminum.

The amount of cocatalyst employed with the catalyst during the polymerization process can vary rather widely. Generally, the molar ratio of organometal cocatalyst to the titanium hydrocarbyloxide employed in forming the inventive catalyst is about 1:1 to about 1500:1. Generally, about 0.1 to 10 mmoles of cocatalyst is employed per liter of diluent. The amount of solid catalyst employed with the cocatalyst can vary depending upon its activity. Typically, about 1 to about 50 mg of catalyst is employed per liter of diluent.

The catalyst system of this invention, that is the catalyst and cocatalyst, can be employed in a batchwise or in a continuous polymerization process.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, is added, and the hydrocarbon diluent is then charged. The reactor is then heated to the desired reaction temperature, e.g. about $50°$ to about $120°$ C., the ethylene is admitted and maintained at a partial pressure within a range of about 0.5 to about 5.0 MPa (70–725 psig). At the end of the reaction period, generally about 1 hour for bench scale testing, the polymerization reaction is terminated by venting unreacted olefin and diluent. The reactor is then opened and the free-flowing white ethylene polymer is collected, dried, and weighed.

In a continuous process, for example, a suitable reactor such as a loop reactor is continuously charged with suitable quantities of solvent or diluent, catalyst, cocatalyst, olefin, and hydrogen, if used. The reactor product is continuously or intermittently withdrawn, and the polymer recovered, e.g. flashing diluent and unreacted olefin and drying the product.

was isolated, washed with several portions of n-hexane, and dried under a vacuum.

Details of the catalyst preparations are given in Table I.

TABLE I

| | | Catalyst Preparation | | | | | | | | |
|---|---|---|---|---|---|---|---|---|---|---|
| | Step A | | | | Step B | | Step C | | | |
| | | | n-Hexane | | Organoaluminum Cpd. | | TiCl$_4$ Treatment | | Yield | Mole Ratios |
| Cat. No. | Metal Chloride Form. mmole | Ti(OC$_4$H$_9$)$_4$ mmole | mL | Time Hrs. | Cpd.$^{(e)}$ | mmole Time Hrs. | TiCl$_4$ g | n-Hexane mL | Prod. g | MCl$_3^{(a)}$ / Ti(OR)$_4$    Ti(OR)$_4^{(b)}$ / Al Cpd |
| 1 | NdCl$_3$ 7.98 | 16.0 | 25 | 0.5 | EASC | 8.0   1 | 8.6 | 25 | 2.93 | 0.50    2.0 |
| 2 | YCl$_3$ 5.12 | 10.2 | 25 | 0.5 | EASC | 5.12   1 | 8.6 | 25 | 1.00 | 0.50    2.0 |
| 3 | SmCl$_3$ 3.89 | 7.79 | 25 | 0.5 | EASC | 3.90   1 | 8.6 | 25 | nd | 0.50    2.0 |
| 4 | LaCl$_3$ 4.08 | 7.79 | 25 | 0.5 | EASC | 3.90   1 | 8.6 | 25 | nd | 0.525   2.0 |
| 5 | PrCl$_3$ 4.04 | 12.2 | 25 | 4 | EASC | 6.04   0.5 | 3.5 | 20 | nd | 0.33    2.0 |
| 6 | PrCl$_3$ 8.09 | 24.3 | 100 | 5 | EASC | 12.1   2 | 8.6 | 50 | 5.42 | 0.33    2.0 |
| 7 | YCl$_3$ 10.2 / MgCl$_2$ 10.5 | 41.6 | 30 | 0.5 | EASC | 20.8   2 | 8.6 | 30 | 4.84 | 0.25$^{(c)}$   2.0 |
| 8 | YCl$_3$ 5.12 / MgCl$_2$ 21.0 | 52.6 | 25 | 10 | EASC | 26.3   1 | 25.9 | 50 | 5.54 | 0.10$^{(d)}$   2.0 |
| 9 | PrCl$_3$ 4.04 / MgCl$_2$ 10.5 | 33.3 | 25 | 4 | EASC | 16.7   2 | 8.6 | 25 | 5.24 | 0.12$^{(e)}$   2.0 |
| 10 | NdCl$_3$ 4.0 | 8.0 | 10 | 24 | EADC | 8.0   1 | 8.6 | 25 | 1.77 | 0.5    1.0 |
| 11 | ErCl$_3$ 4.0 | 8.0 | 10$^f$ | 19 | EASC | 4.0   1 | 5 | 25 | 1.37 | 0.5    2.0 |

$^{(a)}$MCl$_3$ is metal trichloride.
$^{(b)}$Al cpd. is organoaluminum halide.
$^{(c)}$YCl$_3$ + MgCl$_2$/Ti(OC$_4$H$_9$)$_4$ = 0.50, YCl$_3$/MgCl$_2$ = 0.97.
$^{(d)}$YCl$_3$ + MgCl$_2$/Ti(OC$_4$H$_9$)$_4$ = 0.50, YCl$_3$/MgCl$_2$ = 0.24.
$^{(e)}$EADC = ethylaluminum dichloride, and EASC = ethylaluminum sesquichloride.
$^{(f)}$Heptane used as solvent rather than n-hexane.

A further understanding of the present invention and its advantages will be provided by the following examples:

EXAMPLE I

Catalyst Preparations

A. Metal halide preparation.

Unless specified otherwise, the metal halides were prepared from the oxides by dissolving each oxide in dilute hydrochloric acid with stirring, taking care to use a slight excess of the oxide which was then removed by filtration. The solution was evaporated to near dryness causing crystallization of the product which was filtered off, washed with a little absolute ethanol, and dried at room temperature in the air. The hydrated trichloride was dehydrated as known in the art by refluxing with thionyl chloride for about 8 hours (24 hours for lanthanides heavier than europium), washing the isolated product with n-hexane and drying under vacuum. For example, 20 g of the hydrated trichloride can be refluxed with 50 ml of thionyl chloride. The drying procedure was repeated once more with fresh thionyl chloride to insure dehydration was complete.

B. Catalyst preparation.

Each sample of dehydrated metal halide was suspended in n-hexane, a titanium alkoxide added, and the mixture was refluxed for a specified period of time. The mixture was cooled to about 25° C., contacted dropwise under an inert atmosphere, generally argon, with an organoaluminum halide, the solid product was washed several times with n-hexane, resuspended in n-hexane and treated with TiCl$_4$ at about 25° C. The final product

EXAMPLE II

Polymerizations

A 3.8 liter, stirred, stainless steel reactor was employed in each run. It was conditioned for each run by charging it with about 3 liters of dry n-heptane, closing the port, and heating reactor and contents to about 175° C. for 30 mintues. The reactor was drained and purged with nitrogen, then isobutane vapor, and then cooled to about 25° C. The solid catalyst was then added and 3 mmoles of triethylaluminum (TEA) as a 15 weight percent solution in n-heptane was charged. The reactor was closed, about 1 to 2 liters of dry isobutane added as diluent and reactor contents were heated to about 75° C. (or about 95° C.). Hydrogen, if used, was added from a 2.4 liter cylinder, and ethylene was admitted as the temperature was adjusted to 80° C. (or 100° C.). Ethylene was admitted as required during each run to maintain the desired pressure.

Each run was terminated by shutting off the ethylene flow, and venting all volatiles from the reactor. The polymer was recovered, dried, and weighed to determine the yield expressed as grams. The calculated productivity is determined by dividing the polymer yield by the catalyst weight by the time in hours and it is expressed in terms of grams polyethylene (PE) per gram catalyst per hour.

The quantity of each catalyst employed, the reaction conditions employed, and the results obtained are presented in Table II. In some instances, the melt index (MI), high load melt index (HLMI) and the ratio HLMI/MI are given. These values are determined, respectively, by ASTM D 1238-65T, Condition E and Condition F.

TABLE II

| Run No. | Catalyst No. | MCl$_3$ | g | Reactor Temp. °C. | Ethylene Polymerization Pressures, MPa Hydrogen | Ethylene | Total Reactor | Polymer Yield g | Calculated Productivity g PE/g cat/hr | Polymer Properties Melt Index g/10 min | High Load Melt Index | HLMI MI |
|---|---|---|---|---|---|---|---|---|---|---|---|---|
| 1 | 1 | NdCl$_3$ | 0.0242 | 80 | 0 | 0.67 | 2.0 | 576 | 23,800 | —(nd) | — | — |
| 2 | 1 | NdCl$_3$ | .0134 | 100 | 0.41 | 1.6 | 4.0 | 190 | 14,200 | 0.36 | 10.2 | 28 |
| 3 | 2 | YCl$_3$ | .0164 | 80 | 0 | 0.67 | 2.1 | 83 | 5,060 | — | — | — |
| 4 | 3 | SmCl$_3$ | .0167 | 80 | 0 | 0.67 | 2.1 | 12 | 719 | — | — | — |
| 5 | 3 | SmCl$_3$ | .0461 | 100 | 0.41 | 1.6 | 4.1 | 21 | 456 | 0.45 | 25.1 | 56 |
| 6 | 4 | LaCl$_3$ | .0198 | 80 | 0 | 0.67 | 4.0 | 36 | 1,820 | — | — | — |
| 7 | 4 | LaCl$_3$ | .0461 | 100 | 0.41 | 1.6 | 3.4 | 4 | 86.8 | — | — | — |
| 8 | 5 | PrCl$_3$ | .0198 | 100 | 0.41 | 1.6 | 3.5 | 187 | 9,440 | 0 | 0.55 | — |
| 9 | 6 | PrCl$_3$ | .0143 | 100 | 0.41 | 1.6 | 3.8 | 57 | 3,990 | 0 | 2.2 | — |
| 10 | 10 | NdCl$_3$ | .0593 | 100 | 0.41 | 1.6 | 4.0 | 565 | 9,525 | 0.24 | 11.6 | 46 |
| 11 | 7 | YCl$_3$ MgCl$_2$ | .0160 | 100 | 0.55 | 1.6 | 3.7 | 295 | 18,400 | 2.8 | 85.0 | 30 |
| 12 | 8 | YCl$_3$ MgCl$_2$ | .0162 | 100 | 0.41 | 1.6 | 4.0 | 202 | 12,500 | 0.51 | 15.3 | 30 |
| 13 | 9 | PrCl$_3$ MgCl$_2$ | .0111 | 100 | 0.55 | 1.6 | 3.9 | 82 | 7,390 | 3.8 | 115 | 30 |
| 14 | 11 | ErCl$_3$ | .092 | 100 | 0.41 | 1.6 | 4.0 | 58 | 838 | 0.05 | 1.9 | 40 |

Inspection of the results presented in Table II show in runs 1, 2 that catalysts prepared with NdCl$_3$ provide the most active catalysts of the lanthanides tested. The catalysts prepared in the presence of YCl$_3$ or PrCl$_3$ are also active ethylene polymerization catalysts although not as active as NdCl$_3$ as the results of runs 3, 8, 9 indicate. Catalysts produced in the presence of LaCl$_3$ or SmCl$_3$ are less active in polymerizing ethylene than the other lanthanides tested as the results in runs 4, 5, 6, 7, demonstrate. However, the catalysts are still fairly active. The results given in runs 11–13 suggest that catalyst productivity can be enhanced by including some MgCl$_2$ in the catalyst compositions. Surprisingly, catalyst productivity was higher in run 8 in which the YCl$_3$/MgCl$_2$ mole ratio in the catalyst was about 1 than in run 9 in which the YCl$_3$/MgCl$_2$ mole ratio in the catalyst was almost 0.24. A comparison of runs 1 and 10 demonstrates that EADC can be used in place of EASC.

EXAMPLE III

Another series of catalysts were prepared using titanium tetraethoxide rather than titanium tetrabutoxide. The catalysts were evaluated for the polymerization of ethylene using conditions analogous to those used in Example II.

A summary of the variables in the catalyst preparation and the results of the polymerizations are shown in Table III.

EXAMPLE IV

Anhydrous NdCl$_3$ (5.0 g, 20.0 mmoles) was slurried with 50 mL of xylene (mixed xylenes as commercially sold) and 10.5 mL (40.7 mmoles) of 3.88 molar titanium tetraethoxide dissolved in n-heptane. The stirred mixture was heated to 100° C. and maintained at that temperature for one hour during which time the NdCl$_3$ almost completely dissolved. The reaction mixture was cooled to about 25° C. (room temperature) and to it under argon was added dropwise with stirring 25 mL (20.0 mmoles) of a 0.80 molar solution of EASC in n-heptane. A precipitate gradually formed during the addition. Following the addition, the brown slurry was stirred for one hour, stirring was discontinued and the mixture was filtered under argon, washed with n-hexane, and dried under argon to yield 12.0 g of a gray solid catalyst component.

Catalyst A was prepared by stirring a mixture of 2.4 g of the above gray solid catalyst component, 25 mL of n-heptane and 5 mL (8.63 g, 45.5 mmoles) of TiCl$_4$ at about 25° C. for one hour. The final solid product was recovered by filtration, washed with several portions of n-hexane and dried under a vacuum to give 1.89 of a gray solid, hereafter referred to as Catalyst A. A subsequent partial analysis of Catalyst A showed it contained 8.8 weight percent Ti and 44.2 weight percent Cl.

Catalyst B was prepared by stirring a mixture of 2.4 g of the above gray solid catalyst component and 20 mL

TABLE III

| Run No. | Metal Chloride Form | Mmole | Ti(OC$_2$H$_5$) Mmole | Step A Solvent | Organoaluminum Cpd. Compound | Mmole | TiCl$_4$ g | Polymerization Temp. °C. | H$_2$, MPa | C$_2$H$_2$, MPa | Productivity PE/g Cat/hr |
|---|---|---|---|---|---|---|---|---|---|---|---|
| 15 | YCl$_3$ | 10.25 | 30.7 | n-Hexane | EASC | 15.4 | 3.5 | 80 | 0 | 0.67 | 401 |
| 16 | PrCl$_3$ | 4.05 | 12.4 | n-Hexane | EASC | 6.1 | 8.6 | 100 | 0.41 | 1.6 | 317 |
| 17 | PrCl$_3$ | 4.05 | 12.6 | n-Hexane | EADC | 12.9 | 8.6 | 100 | 0.41 | 1.6 | 105 |
| 18 | PrCl$_3$ | 4.00 | 7.98 | Xylene | EASC | 4.0 | 8.6 | 100 | 0.41 | 1.6 | 6,760 |
| 19 | CeCl$_3$ | 3.98 | 7.98 | Xylene | EASC | 4.0 | 8.6 | 100 | 0.41 | 1.6 | 2,720 |
| 20 | SmCl$_3$ | 3.75 | 11.2 | n-Hexane | EADC | 11.3 | 8.6 | 100 | 0.41 | 1.6 | 452 |

These data indicate that titanium ethoxides are suitable for preparing active catalysts. The data also illustrate that EADC or EASC is a satisfactory organoaluminum compound. Further, the data illustrates that different solvents can be employed in Step A.

(34.5 g, 182 mmoles) of TiCl$_4$ at 100° C. for one hour. The product was recovered as before yielding 1.8 g of a pale yellow solid, hereafter referred to as Catalyst B. A subsequent partial analysis of Catalyst B showed it contained 10.0 weight percent Ti and 43.7 weight percent Cl.

Catalyst C was prepared by stirring a mixture of 2.4 g of the above gray solid catalyst component, 10 mL (17.3 g, 91 mmoles) of TiCl$_4$ and 10 mL (13.4 g, 99 mmoles) of HSiCl$_3$ at 100° C. for one hour. The product was recovered as before yielding 1.59 g of a bright yellow solid, hereinafter referred to as Catalyst C. A subsequent partial analysis of Catalyst C showed it contained 4.5 weight percent Ti and 45.6 weight percent Cl.

A portion of each catalyst was tested in ethylene polymerization at 100° C. for one hour in the presence of hydrogen (0.41 MPa), ethylene (1.6 MPa), 3 mmoles of TEA and about 2.0 liters of isobutane as described in Example II. The polymer was recovered and its melt index values determined as shown in Example II.

The quantity of each catalyst employed and the results obtained are given in Table IV.

TABLE IV

Ethylene Polymerization At 100° C.

| Run No. | Catalyst No. | Polymer Yield, g | Calculated Productivity g PE/g cat/hr | Polymer Properties | | |
|---|---|---|---|---|---|---|
| | | | | MI | HLMI | HLMI/MI |
| 21 | A | 0.0186 | 285 | 15,300 | 0.51 | 19 | 37 |
| 22 | B | 0.0091 | 100 | 11,000 | 0.57 | 23 | 40 |
| 23 | C | 0.0074 | 136 | 18,400$^{(a)}$ | 0.23 | 9.2 | 40 |

$^{(a)}$Equivalent productivity in terms of g PE/g Ti/hr is 409,000.

The results show that active ethylene polymerization catalysts were produced, the most active being Catalyst C of run 23. Catalyst C was prepared by contacting the NdCl$_3$/Ti(OC$_2$H$_5$)$_4$- EASC reaction product with an approximately 1:1 molar ratio (actually 0.92:1) of TiCl$_4$ to HSiCl$_3$ to form the catalyst. The polymers appear to be similar in melt index properties to those made in Example II.

The polymers made with the catalysts of this invention appear to be similar in shear response based on the HLMI/MI ratio obtained to those produced with other catalyst systems based on a titanium halide and an organometal cocatalyst. Thus, the polymers appear to have the relatively narrow molecular weight distributions (based on HLMI/MI) typical of polymers made with such catalyst systems.

The polymers produced according to the present invention have numerous applications which will be obvious to those skilled in the art from their properties. Typical applications include fibers, films, pipe, containers, and the like which can be made with conventional plastics fabrication equipment.

What is claimed is:

1. A process for the polymerization of alpha-olefins monomers comprising contacting said monomers under polymerization conditions with a catalyst system comprising (A) a catalyst prepared by
   (1) reacting at least one metal halide selected from the halides of scandium, yttrium, and rare earth metals having atomic numbers in the range of 57 to 71 with at least one transition metal compound in which the transition metal is titanium and in which the transition metal is bonded to at least one atom selected from the group consisting of oxygen, nitrogen, and sulfur, and said oxygen, nitrogen, and sulfur atoms are in turn bonded to a carbon-containing radical, then
   (2) reacting the product of (1) with an organometallic compound comprising an organoaluminum compound, and then
   (3) treating the resulting solid with a halide ion exchanging source comprising at least one of the group consisting of halides of titanium, and (B) a cocatalyst comprising organometallic compounds of metals of Groups IA, IIA, IIB, and IIIA.

2. A process according to claim 1 wherein said catalyst is prepared from at least one transition metal compound comprising a titanium hydrocarbyloxide of the formula Ti(OR)$_4$ wherein each R is individually selected from a hydrocarbyl radical and at least one organometallic compound is an organoaluminum halide of the formula AlR'$_n$X$_{3-n}$ where R' is a hydrocarbyl radical containing 1 to 20 carbon atoms, and n is any number such that $1 \leq n \leq 2$.

3. A process according to claim 2 wherein said transition metal compound comprises at least one titanium tetraalkoxide.

4. A process according to claim 2 wherein said catalyst is prepared from at least one transition metal compound selected from titanium tetrabutoxide and titanium tetraethoxide, ethylaluminum sesquichloride, and titanium tetrachloride.

5. A process according to claim 4 wherein said cocatalyst comprises an organoaluminum compound of the formula AlR'$_m$Y$_{3-m}$ wherein each R' is a hydrocarbyl radical, each individually selected from the group consisting of alkenyl, alkyl, cycloalkyl, aryl, alkaryl, and aralkyl radicals containing 1 to 20 carbons atoms, Y is a monovalent radical selected from hydrogen and the halides, and m is a number in the range of 1 to 3.

6. A process according to claim 5 wherein said metal halide consists essentially of neodymium trichloride.

7. A process according to claim 5 wherein said metal halide consists essentially of yttrium trichloride.

8. A process according to claim 5 wherein said metal halide consists essentially of praseodymium trichloride.

9. A process according to claim 5 wherein magnesium dichloride is employed in combination with said metal halide.

10. A process according to claim 9 wherein said metal halide is selected from yttrium trichloride and praseodymium trichloride.

11. A process according to claim 5 wherein said halide ion exchanging source comprises titanium tetrachloride and trichlorosilane.

12. A process according to claim 6 wherein said halide ion exchanging source comprises titanium tetrachloride and trichlorosilane.

13. A process according to claim 4 wherein said cocatalyst comprises triethylaluminum.

14. A process according to claim 13 wherein said monomers are at least 90 mole percent ethylene.

* * * * *